United States Patent
Weber et al.

(10) Patent No.: US 9,734,257 B2
(45) Date of Patent: Aug. 15, 2017

(54) EXPORTED OVERLAYS

(75) Inventors: Karon A. Weber, San Francisco, CA (US); Liang-Yu Chi, San Francisco, CA (US); Samantha M. Tripodi, San Francisco, CA (US)

(73) Assignee: EXCALIBUR IP, LLC, New York, NY (US)

( * ) Notice: Subject to any disclaimer, the term of this patent is extended or adjusted under 35 U.S.C. 154(b) by 782 days.

(21) Appl. No.: 11/644,696

(22) Filed: Dec. 22, 2006

(65) Prior Publication Data
US 2008/0155060 A1 Jun. 26, 2008

(51) Int. Cl.
*G06F 17/30* (2006.01)

(52) U.S. Cl.
CPC .............................. *G06F 17/3089* (2013.01)

(58) Field of Classification Search
CPC ................................................. G06F 17/3089
USPC ............ 709/218; 705/14; 707/104, 100, 758
See application file for complete search history.

(56) References Cited

U.S. PATENT DOCUMENTS

| | | | |
|---|---|---|---|
| 6,498,982 B2 * | 12/2002 | Bellesfield et al. | 701/533 |
| 6,636,803 B1 * | 10/2003 | Hartz et al. | 701/459 |
| 6,906,643 B2 * | 6/2005 | Samadani et al. | 340/995.18 |
| 7,007,228 B1 * | 2/2006 | Carro | G01C 21/26 340/990 |
| 7,039,596 B1 | 5/2006 | Lu | |
| 7,382,290 B2 * | 6/2008 | Bowling | 340/995.14 |
| 7,466,244 B2 * | 12/2008 | Kimchi | G01C 21/26 340/8.1 |
| 7,559,034 B1 * | 7/2009 | Paperny et al. | 715/803 |
| 7,584,435 B2 * | 9/2009 | Bailey | G06F 9/44526 707/999.102 |
| 8,051,089 B2 * | 11/2011 | Gargi et al. | 707/758 |
| 2003/0184563 A1 * | 10/2003 | Wiant, Jr. | G01C 23/005 345/629 |
| 2004/0217884 A1 * | 11/2004 | Samadani et al. | 340/995.14 |
| 2004/0220906 A1 * | 11/2004 | Gargi et al. | 707/3 |
| 2005/0015370 A1 * | 1/2005 | Stavely et al. | 707/6 |

(Continued)

OTHER PUBLICATIONS

Dimon, G. (Nov. 14, 2005). "Microformats Primer," Digital Web Magazine located at <http://www.digital-web.com/articles/microformats_primer> last visited on Mar. 6, 2007, six pages.

(Continued)

*Primary Examiner* — Sheree Brown
(74) *Attorney, Agent, or Firm* — James J. DeCarlo; Greenberg Traurig, LLP

(57) ABSTRACT

An overlay generator recognizes specific types of content and metadata present on a web site, and retrieves additional content related to the web site from other sources. The overlay generator makes the additional content available in a web browser as an overlay or as a hyperlink, so that the additional content can be viewed in combination with the original web site content. For example, if a zip code is present on a web site, and the web site includes a static map showing points of specialized interest in that zip code, then the overlay generator recognizes the zip code as a specific type of content related to maps, and retrieves an interactive map of the zip code from a map service, and generates an overlay for superimposing the interactive map on the static map, so that the content of both maps is displayed in a single integrated map.

26 Claims, 7 Drawing Sheets

(56) References Cited

U.S. PATENT DOCUMENTS

| | | | |
|---|---|---|---|
| 2006/0031404 A1* | 2/2006 | Kassab | G06F 17/30893 709/218 |
| 2006/0064348 A1* | 3/2006 | Li | G06Q 30/0261 705/14.58 |
| 2006/0118636 A1* | 6/2006 | Miles | A62B 99/00 235/472.01 |
| 2006/0123340 A1* | 6/2006 | Bailey | G06F 9/44526 715/700 |
| 2006/0200382 A1* | 9/2006 | Arutunian | G06Q 30/02 705/14.58 |
| 2006/0200384 A1* | 9/2006 | Arutunian | G06Q 30/02 705/14.69 |
| 2006/0238383 A1* | 10/2006 | Kimchi | G01C 21/26 340/995.1 |
| 2006/0271277 A1* | 11/2006 | Hu | G01C 21/3605 701/533 |
| 2008/0109718 A1* | 5/2008 | Narayanaswami | G06Q 10/109 715/262 |

OTHER PUBLICATIONS

Gemmell, J. et al. (Dec. 1-6, 2002). "MyLifeBits: Fulfilling the Memex Vision," *ACM Multimedia '02* located at <http://research.microsoft.com/~jgemmell/pubs/MyLifeBitsMM02.pdf>, four pages.

Gemmell, J. et al. (Nov. 7, 2003). "The MyLifeBits Lifetime Store," *ETP'03* located at <http://research/microsoft.com/~jgemmell/pubs/ETP2003.pdf>, four pages.

Gemmell, J. et al. (Feb. 20, 2006). "MyLifeBits: A Personal Database for Everything," *Microsoft Bay Area Research Center* MSR-TR-2006-23, located at <http://ftp.research.microsoft.com/pub/tr/TR-2006-23.pdf>, eighteen pages.

Kerr, B. et al. (Apr. 24-29, 2004). "Designing Remail: Reinventing the Email Client Through Innovation and Integration," *Conference on Human Factors in Computing Systems CHI'04 Extended Abstracts on Human Factors in Computing Systems* located at <http://portal.acm.org/citation.cfm?id=985944&dl=acm&coll=&CFID=15151515&CFTOKEN=6 184618> last visited on Mar. 6, 2007, pp. 837-852.

Microformats. (Date Unknown). "hCalendar," located at <http://microformats.org/wiki/hcalendar> last visited on Feb. 6, 2007, eight pages.

Microformats. (Date Unknown). "hCard," located at <http://microformats.org.wiki/hcard> last visited on Feb. 6, 2007, ten pages.

Microformats. (Date Unknown). "Microformats Wiki," located at <http://microformats.org.wiki/Main_Page> last visited on Feb. 6, 2007, six pages.

Rohall, S.L. et al. (Oct. 28, 2003). "IBM Research Report ReMail: A Reinvented Email . Prototype," RC22949 (W0310-166), located at <http://64.233.167.104/search?q=cache:Uokw2HSzrSUJ:domino.watson.ibm.com/library/cyberdig.nsf/papers/19545E80F6D43F1685256DD3005EF422/%24File/rc22949.pdf+ibm+remail+chi&hl=en&ct=cink&cd=3&gl=us>, two pages.

Stem, M.K. (2003). "Identifying and Understanding Dates and Times in Email," *IBM Watson Research Center Technical Report #:03-11* IBM RC#22875, located at <http://domino.research.ibm.com/cambridge/reserach.nsf/2b4f81291401771785256976004a8d13/d9a38d8e3230f3a585256daa005d86a7?OpenDocument>, ten pages.

U.S. Appl. No. 11/644,812, filed Dec. 22, 2006, for Weber et al.

Non-Final Office Action mailed on Oct. 15, 2008, for U.S. Appl. No. 11/644,812, filed Dec. 22, 2006, thirteen pages.

Final Office Action mailed on Apr. 15, 2009, for U.S. Appl. No. 11/644,812, filed Dec. 22, 2006. 16 pages.

Non-Final Office Action mailed on Oct. 20, 2009, for U.S. Appl. No. 11/644,812, filed Dec. 22, 2006. 15 pages.

* cited by examiner

EXPORTED OVERLAYS

BACKGROUND OF THE INVENTION

Field of the Invention

The present invention relates generally to online content, and more specifically to combining online content from multiple online data sources.

Description of the Related Art

A web site may display information, such as a map, with annotations, such as descriptions of points of interest on the map. For example, on the Yahoo!® web site, a user can turn on a smart view feature, and the locations of points of interest such as ATM's and gas stations will be displayed as annotations on the map. The user can find restaurants by type. The annotations are included on the map when the map is generated for display in the user's web browser. That is, the annotations are provided by the same party as the map. However, the annotations do not appear on maps provided by other parties, such as maps provided by a second party's web site. These other maps may, however, include other information of interest to the user, such as annotations created by the second party. The annotations provided by the first party are not displayed on the map provided by the second party, because the second party does not have access to the first party's annotation data. However, the annotation data of both parties may be of interest to the user. Existing techniques for integrating the display of annotations from both parties onto a single map involve the use of programming interfaces provided by one party for access by the other. However, such programming interfaces are complicated and time-consuming to use, and require effort, in the form of programming or other configuration, on the part of at least one of the parties to integrate their information with the other party.

There are two common approaches to integrating a web site with content from other services or sites. In the explicit API developer model, a developer needs to do something, such as write computer code, to send data to or receive data from another web site. In the second approach, there is a link or button that a user can click to access a site or service. In that approach, users typically leave the original site when accessing the other site Software applications can combine data from different web sites or online services, such as a map from one web site, and location descriptions from a different web site. There are drawbacks to such software applications, however. To meaningfully combine data from different web sites, i.e., to combine data based on the context or meaning of the data, the applications typically require programming effort, or are dependent on specific details of the web sites or online services. For example, a meaningful combination of the map and location description data mentioned above would be a map in which the location descriptions appear as labels on the map in their corresponding geographic locations. A software developer may develop a software application to interact with a web site using programming interfaces or tools provided by the web site publisher, The developer can use an Application Programming Interface (API) provided by the site publisher, which involves specific programming, or the developer can program using the specific format of data provided by the web site, e.g., by coding the format of the web site into the software, or by parsing a site map.

A television set top box may display information about video shown on the TV. If a user is watching a baseball game, and the set top box may overlays statistics about baseball players on top of the person. The overlay model provides for simultaneous display of multiple types of information.

Therefore it would be desirable to have a simple way to meaningfully combine data from multiple web sites, without requiring programming.

SUMMARY OF THE INVENTION

In general, in a first aspect, the invention features a computer-enabled method of combining online content from multiple sources. The method includes the steps of acquiring site content from a web site, acquiring descriptive data associated with the site content, where the descriptive data conforms to a defined format, retrieving additional content from an online data source, wherein the additional content is selected based upon the descriptive data, and displaying at least a portion of the additional content in combination with the site content, where the overlay is based upon the additional content. Embodiments of the invention may include one or more of the following features. The online data source may provide the additional content in response to a request in a defined format, and the online data source may comprise a web site, a web service, or a combination thereof. Identifying descriptive data may include the step of searching the site content for a text string that conforms to the defined format, wherein the descriptive data comprises the text string. The defined format may include a numeric zip code format, a street name format, a city name format, a country name format, or a combination thereof. Features of the site content may be displayed in combination with features of the additional content. The site content may comprise a web page, and may include the descriptive data. The site content may comprise a reference to a data storage object that conforms to a defined file type, and the data storage object includes the descriptive data. Identifying an online data source may comprise choosing an online map service if the site content comprises a map. Retrieving additional content from the online data source may comprise retrieving a map of a location specified by the descriptive data. Retrieving a map of the location may comprise retrieving a map of a zip code, a city, a street address, of a combination thereof. Retrieving a map of the location may comprise retrieving a map with a specified orientation, where the descriptive data includes the specified orientation. Retrieving a map of the location may comprise retrieving a map with a specified scale, wherein the descriptive data includes the specified scale. Displaying at least a portion of the additional content may comprise generating a displayable image to be superimposed on the site content, where the displayable image comprises the additional content. The displayable image may comprise a semi-transparent overlay to be displayed in a web browser.

In general, in a second aspect, the invention features a computer-enabled method of generating an overlay using a toolbar associated with a web browser. The method includes the steps of acquiring site content from the web browser, searching the site content for descriptive data, where the descriptive data conforms to a defined format, selecting based upon the site content at least one online data source, retrieving additional content from the online data source, and causing an overlay to be generated for displaying the additional content over the site content in the web browser. Embodiments of the invention may include one or more of the following features. Displaying the additional content over the site content may include superimposing the additional content on the site content, so that features of both the additional content and the site content are simultaneously visible to the user of the web browser. The site content may be acquired from a search engine, and generating an overlay may include the steps of generating a hyperlink that refers to the additional content, and associating the hyperlink with the site content.

In general, in a third aspect, the invention features a computer-enabled method of annotating content, the method including the steps of receiving selection of a portion of the content, receiving selection of a type of the content, prompting a user for information, where prompting is based upon the type of the content, generating an annotation based upon the information, and storing the annotation in association with the content. Embodiments of the invention may include one or more of the following features. The method of claim 18, wherein storing the annotation comprises storing the annotation in a file to be hosted on a web server, wherein the type of the file is based upon the annotation.

In general, in a fourth aspect, the invention features a user interface for displaying an integration of online content from multiple online data sources. The method includes the steps of receiving site content from a web site, receiving descriptive data that describes at least a portion of the site content, where the descriptive data is in a defined format, generating a request for additional content, wherein the request is based upon the descriptive data, receiving the additional content from an online data source, and displaying the additional content over the site content, wherein features of the site content are displayed in combination with features of the additional content.

In general, in a fifth aspect, the invention features a computer-readable medium comprising instructions for combining online content from multiple sources, the instructions for causing performance of a method that includes the steps of acquiring site content from a web site, acquiring descriptive data associated with the site content, wherein the descriptive data conforms to a defined format, retrieving additional content from an online data source, wherein the additional content is selected based upon the descriptive data, and displaying at least a portion of the additional content in combination with the site content, wherein the overlay is based upon the additional content. Embodiments of the invention may include one or more of the following features. A system may include the computer readable medium, may further include a processor for executing the instructions stored on the computer readable medium.

DETAILED DESCRIPTION OF THE EMBODIMENTS

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
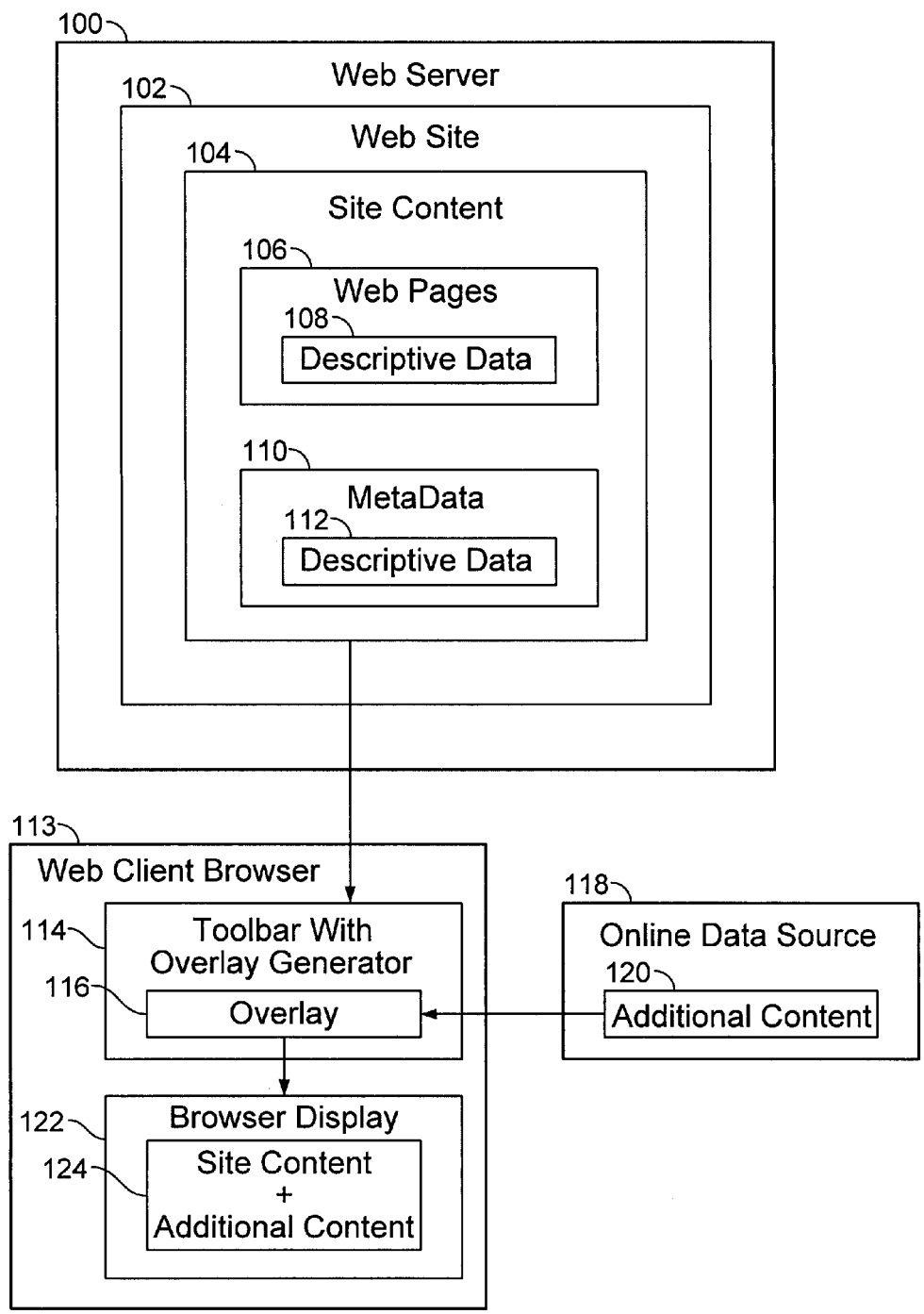
FIG. 1 is an illustrative drawing of an overlay generator according to some embodiments of the invention.

FIG. 1 is an illustrative drawing of an overlay generator 114 according to some embodiments of the invention. A web server 100 provides a web site 102, which includes site content 104. The site content 104 includes web pages 106 and optional metadata 110. The web pages 106 may include descriptive data 108, and the metadata 110 may similarly include descriptive data 112. The descriptive data 108 is typically data that is part of the site content 104. The descriptive data 112 is typically associated with the site content 104, e.g., a different file on a web server in the same directory as the site content 104. In one aspect, the descriptive data 108 is in a particular format, such as an address, a zip code, a company name, or the like. The descriptive data 112 is typically in a particular data format, such as vCard, iCalendar, a microformat, or another defined data format. For example, descriptive data for an event in iCalendar format would be as follows:

```
BEGIN:VCALENDAR
PRODID:-//XYZproduct//EN
VERSION:2.0
BEGIN:VEVENT
URL:http://www.web2con.com/
DTSTART:20051005
DTEND:20051008
SUMMARY:Web 2.0 Conference
LOCATION:Argent Hotel\, San Francisco\, CA
END:VEVENT
END:VCALENDAR
```

As that example illustrates, the descriptive data is in one aspect a structured form of data that can be used to describe content. The corresponding content would be, for example, "Web 2.0 Conference: October 5-7, at the Argent Hotel, San Francisco, Calif."

The descriptive data can be used to automatically search for additional online content that is related to the described content. For example, a search can automatically be performed for other events that occur on the same days by searching for events that occur between DTSTART and DTEND. Events in the same location can be located by searching for events with the same LOCATION value.

Without the defined format, searching is still possible, because the content can be parsed, but parsing the content itself typically involves searching for strings of particular formats. For example, the content could be searched for dates by searching for month names followed by numbers.

When a user of a web client browser 113 accesses the site content 102, an overlay generator 114, which is, for example, computer program code executing in a browser toolbar, searches the site content for descriptive data 108 and metadata 110. If the overlay generator 114 finds any such descriptive data or metadata, it determines a relevant type of online data source 118, and retrieves additional content 120 from the online data source 118. The online data source 118 is typically a feed, i.e., a list of information aggregated from a variety of sources contracted by a provider, or a web site, or a web service. The online data source 118 provides additional content 120, such as maps, personal contact information, general financial information, personal financial information, news, or any type of data that can be retrieved by a query specified in a defined format, such as a list of name-value pairs in an HTTP request, or a SOAP (Simple Object Access Protocol) request message, or the like. The online data source 118 provides the additional content in a defined format, which may be name-value pairs in an HTTP response, or a SOAP message, or the like. The descriptive data 108 typically conforms to a defined metadata format for specifying annotations, which may be a name-value pair format, or a domain-specific format, such as a business object format for specifying names, addresses, and transaction information. The online data source 118 may accept requests and send replies in another defined format, such as HTTP or SOAP messages, as described above. In one aspect, after retrieving the additional content from the online data source 118, the overlay generator 114 creates an overlay 116 for displaying the additional content as on overlay superimposed on the site content 104 in the browser. As a result, the browser display 112 shows a combination content 124 of the site content 104 and the additional content 120. The overlay 116 is a semi-transparent surface upon which the additional content 120 may be displayed. The overlay 116 may then be displayed in the same region as the site content 104 to produce the combined display 122. The term overlay refers to a type of display object in a web browser. Overlays that are semi-transparent allow an underlying portion of displayed content, such as the site content 104, to be visible in combination with the overlaid content, e.g., the additional content 120. Overlays are one way of achieving the combined content display 122. Other techniques may be used, such as rendering a single image that includes both the features of the site content 104 and the additional content 120.

Figure 2A:
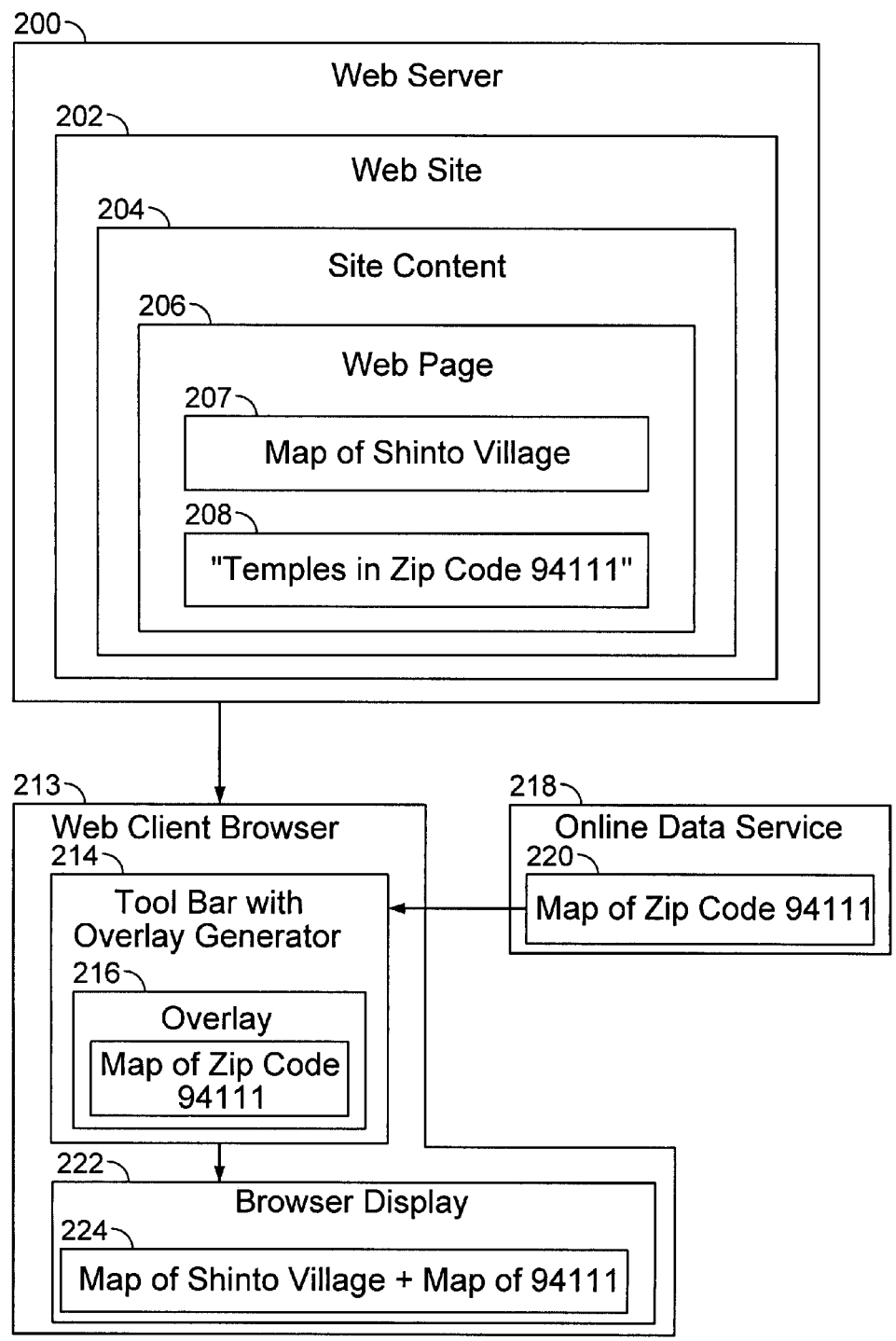
FIG. 2A is an illustrative drawing of an overlay generator operating on map data according to some embodiments of the invention.

FIG. 2A is an illustrative drawing of an overlay generator 214 operating on map data according to some embodiments of the invention. The site content 204 includes a web page 206, which includes a map 207 of a Shinto Village, and text 206, which states "Templates in zip code 94111". A web client browser 213 executes a toolbar 214, which retrieves a map 220 of zip code 94111 from an online map service 218. The overlay generator 214 creates an overlay 216 which includes the map 220 of zip code 94111. The overlay 216 may be superimposed on the map 207 of the Shinto Village in the browser display 222 to create a combination content display 224 that shows both maps.

Figure 2B:
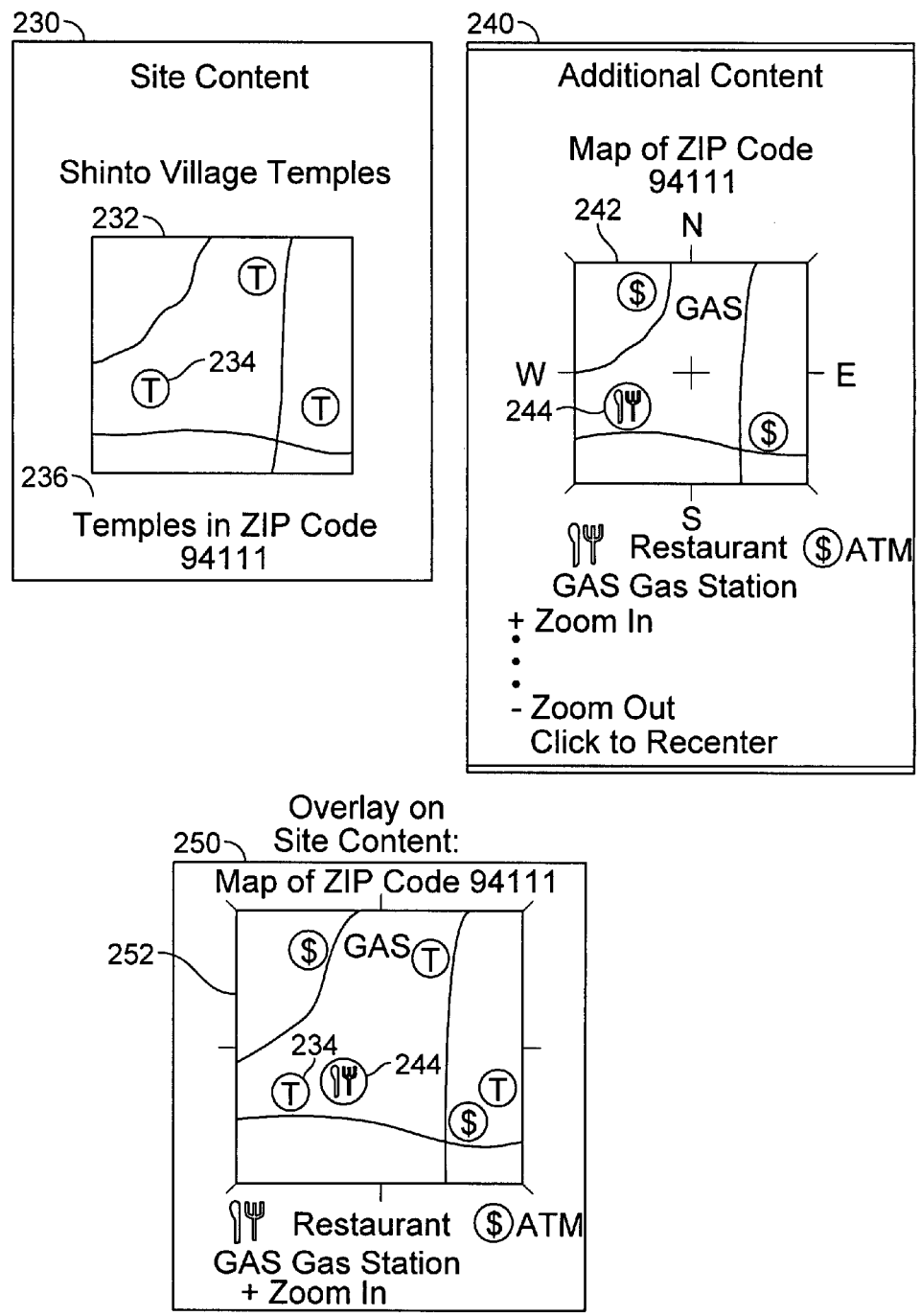
FIG. 2B is an illustrative drawing of an overlay according to some embodiments of the invention.

FIG. 2B is an illustrative drawing of an overlay according to some embodiments of the invention. Site content 230 includes a map 232 of a Shinto Village. The map 232 shows a temple location 234. Additional content 240 includes a map 242 of zip code 94111. The map 242 shows a restaurant location 244.

In one aspect, the additional content 240 may be combined with the site content 230 directly to produce combined content 250. In another aspect, the additional content 240 may be used to form a semi-transparent overlay, which can be displayed over the site content 230 to produce the combined content 250. Techniques for forming a semi-transparent overlay are known to those skilled in the art of web site development. In either case, when the additional content 240 is overlaid or combined with the site content 230, the combined content 250 includes a map 252 which displays the features of both map 232 and map 242, including the Template 234 and the restaurant 244. The features of the site content 230, such as the temples shown by the T icons 234, are displayed in combination with features of the additional content 240, such as the restaurant icon 244 and the ATM icons 246. The combined content 250 also includes other features of the additional content 240, such as a Zoom In feature.

When a site publisher publishes a web page, the site publisher can enable access to services provided by other web sites or web services, such as a map service, by providing information that the services can recognize. Then, with the help of an intermediary process, such as a toolbar that includes an overlay generator 214, the content provided by the other web sites or web services can be presented as optional overlays that the user can select to display additional information as an overlay. The services generate the information for the overlay based on the content of the publisher's site. Publishers therefore need not use an Application Programming Interface to integrate their web sites with services that use the overlay generator technique.

A web site may display content such as a map of a geographic location. The map may include features that are contributions of that web site, and are not included in typical maps provided by mapping services. If a web site includes descriptive data in a recognizable format that describes the map, e.g., a zip code of the map location, then the overlay generator can recognize the descriptive data, retrieve additional content based upon the descriptive data, and generate an overlay that augments the web site with portions of the additional content, where the additional content is selected based upon the descriptive data. In one aspect, the descriptive data is an annotation provided by the web site along with the site content, and the descriptive data is in a standardized or defined format. For example, the overlay generator can determine the location of an item displayed on a simple map on a web site. The location is determined based on descriptive data that includes address information such as a zip code, and the overlay generator then retrieves a more detailed map of that address. The more detailed map can then can be overlaid onto the web site as a semi-transparent overlay, so that the features contributed by the web site, i.e., the simple map, are shown on a more comprehensive map. The more comprehensive map may include additional features such as driving directions and locations of nearby businesses. For example, a web site may show a map of Shinto Village temples, and a Yahoo!® map (i.e., a map provided by Yahoo!® maps, which is an online data source) showing Automated Teller Machines (ATM's) maybe overlaid over the map of the templates, so that the result will be a display of all the ATMs around the temples.

As another example, a first party's web site may have a contact page that includes address information and a rough map to the address. When a user visits that web site, the user is presented with a notice that there is address information on the page that is currently displayed. An option is provided to allow the user to click a map overlay to pull down a layer which is a Yahoo!® map that displays the geographical location of the address with all the details provided by the Yahoo!® maps online data source.

By being able to detect location data for the map displayed on the web site, a map overlay can be retrieved and centered on that location to show features, e.g., Automated Teller Machines, gas stations, and other points of interest, that are near the location. The site publishers are able access the features of the mapping service by providing content or metadata that describes their content, e.g., a zip code that describes the location shown by the map. In the map example, the content or metadata may be any type of information that specifies a geographical location, e.g., a zip code, a city name, a street address, or the like. The content or metadata is sometimes referred to herein as an "annotation" of the content. It is actually possible to do that, but you need to include enough metadata. If the content of metadata includes latitude, longitude, and orientation, then the overlay can be closely matched to the map on the web site. If the content does not include that information, then the overlay may show a more general map.

Figure 3:
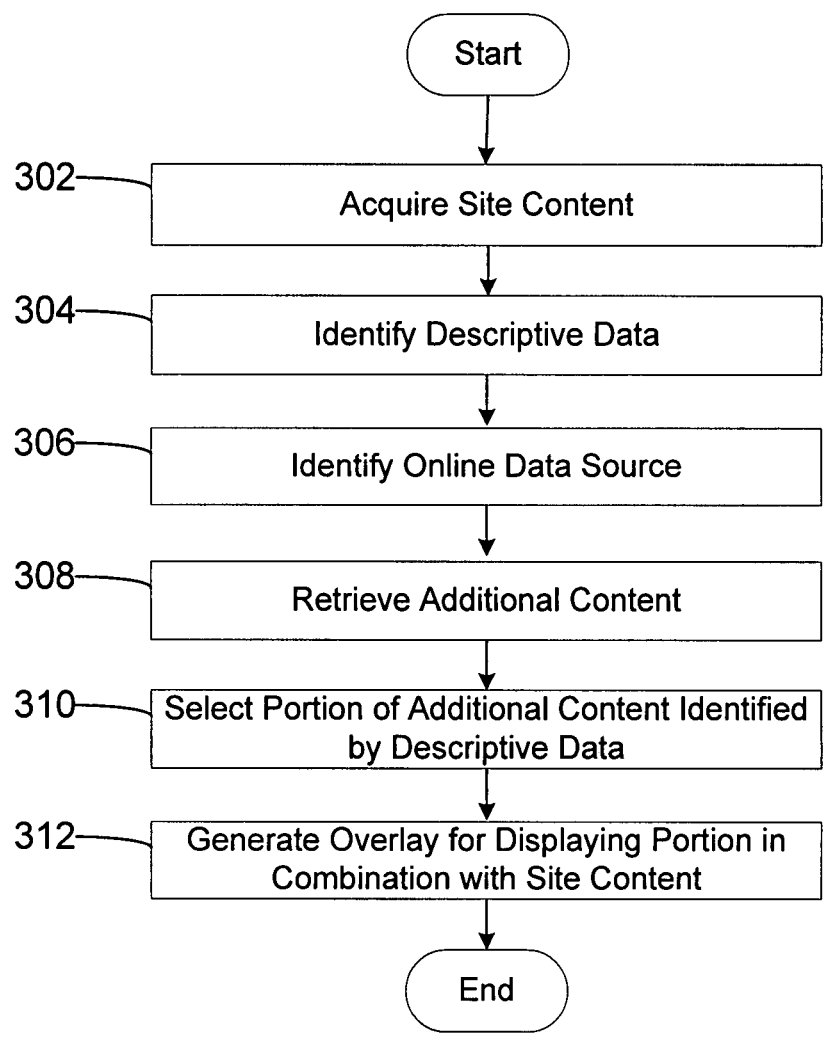
FIG. 3 is an illustrative flow diagram of a process for generating an overlay according to some embodiments of the invention.

FIG. 3 is an illustrative flow diagram of a process for generating an overlay according to some embodiments of the invention. An overlay is generated by first acquiring site content from a web site at block 302, identifying formatted descriptive data in the site content at block 304, and identifying an online data source capable of providing additional information relevant to the site content at block 306. Additional content is then retrieved from the online data source at block 308. The additional content is selected based upon the descriptive data at block 310. Next, the additional content that is related to the descriptive data is used to generate an overlay for displaying the portion of the additional content in combination with the site content at block 312. The overlay includes the additional content and is generated using, for example, Cascading Style Sheets and JavaScript™, to produce an image that can be superimposed on the original web site's content. The content is superimposed on the site content because the site content may include information not available to the online data source.

The original web site's content is, for example, data in the Hypertext Markup Language (HTML) format, which includes text data that can be searched for descriptive data that conforms to particular formats, such as zip codes, addresses, city names, country names, names of people, names of businesses, and the like. For example, since zip codes are typically 5-digit (or 9-digit) numbers, a zip code can be recognized in HTML content by searching for 5 consecutive numeric characters that are separated from other characters by at least one space character.

In one embodiment, if the web site is for the location of a restaurant, the map overlap does not show features of the same type, e.g., other restaurants. The map overlay does show features of other types, such as the locations of ATMs in parking lots.

In one aspect, descriptive data provided by the web site enables a handshake between the web site and an online data source that is separate from the web site. The descriptive data may be data embedded in the content, or may be separate from the content, but associated with the content, i.e., metadata stored in a file in the same directory as the content with a standardized name, or in a file with a name based on the URL of the content. In the content case, in which the content itself contains text, such as a zip code, that provides descriptive information about other portions of the content, the handshake may be done without the site publisher providing separate metadata. The site publisher may provide descriptive information in the form of a small piece of data, such as an address on the page being published. In another aspect, the site publisher may leave a v-card or any other type of data format that has location information on it. Computer code executing in a client's browser, such as the Yahoo!® toolbar can then detect the descriptive information.

In one aspect, the descriptive data conforms to a particular format, such as a microformat. A microformat is a defined, i.e., codified, format that can be embedded in HTML to provide for decentralized development. For example, hCalendar is a microformat based on the vCalendar standard.

In one aspect, a Yahoo!® buzz service can provide the additional content. So, for example, the buzz service knows where highly-rated locations are, and has comments and rating and reviews for map locations. These ratings, comments, and reviews can be displayed in an overlay on a web site's content by generating an overlay for maps provided by the web site, using the buzz service as the online data server.

With the content generator, there is no need for the site provider to write computer code using an Application Programming Interface (API) to bring in some element of an online data service. Furthermore, the user need not navigate away from the web site to access the service, since the service is overlaid on the web site. For example, an online data service may provide rich mapping services and ways to get directions and other infrastructure. If a site publisher simply includes an address in a recognizable form on a site, the overlay generator can display the site content in a rich way and provide other ways to interact with the data. The site publisher simply includes content saying, for example, "If you want to see other temples go to locations X, Y, and Z." The overlay generator consumes the site data and displays maps for locations X, Y, and Z.

Other types of content could be overlaid as well, such as photographs and personal information. For example, the vCard format stores contact data in a standardized format. A v-card for a business includes the business's name, address, owner's name and address, phone numbers, and the like. A site provider can add a vCard file to the root of their web site. The overlay generator can then detect the vCard and generate overlays based on the metadata in the vCard. For example, an overlay could allow a user to add the business as a Yahoo!® contact. Similarly, the iCalendar format stores calendar information such as appointments and tasks. If the overlay generator detects an iCalendar file in the root of a web server, it can generate an overlay which will allow a user to view a map of locations of events on the calendar.

A user may pull down multiple different overlays over a web site, such as a social buzz layer and a map layer. Users can annotate the layers by associating content or metadata with the layers. For example, a user can annotate a layer provided by Yahoo®! A user can annotate their own layer, and only the user will be able to see annotations to their own layer.

The overlay generator may be executed as part of a component, such as a Yahoo!® toolbar, or another browser feature, or a batch process that processes search engine results. If the user has a toolbar installed, and the toolbar includes the overlay generator, then the overlay generator may be executed when a page is loaded by the browser. With the toolbar, the overlay generator can use a "gleam" to detect rich content in the page and identify relevant services For example, when a user clicks on a feature on a web page that is gleaming, the overlay generator may bring the service down to be displayed over the web page. If the user does not have a toolbar, then a bookmark can be generated to reference the additional content. The bookmark can be generated during a web search, or using results from a web search.

Site publisher tools may include a feature for defining overlays. In an overlay section of the site publisher tools, a site publisher specifies the type of metadata, drops in metadata such as a vCard, and provides information for the vCard. As another example, the site publisher may drop in an iCalendar, write addresses and date. The site publisher tool will then set up the metadata to be accessed by the overlay generator.

When a user visits a web page, the site publisher attempts to generate overlays for the page. If any overlays are successfully generated by a toolbar, the site publisher displays controls for activating them, e.g., using a gleam or a button. A user may then click on the control to cause the browser to display the overlay, and the corresponding additional content, over the web page. If no toolbar is available, a hyperlink to the additional content may be displayed on or nearby the web page. As another alternative to the toolbar, a Yahoo!® widget may appear on the user's desktop that could display the original web site and the additional content in two different windows or in two panes of the same window.

If a user requests that the overlay be displayed, then advertising may also be displayed along with the additional content. For example, if a user views a Japan map that shows where Shinto Village temples are, guides to those temples, as well as other kinds of relevant things, may be displayed.

Figure 4:
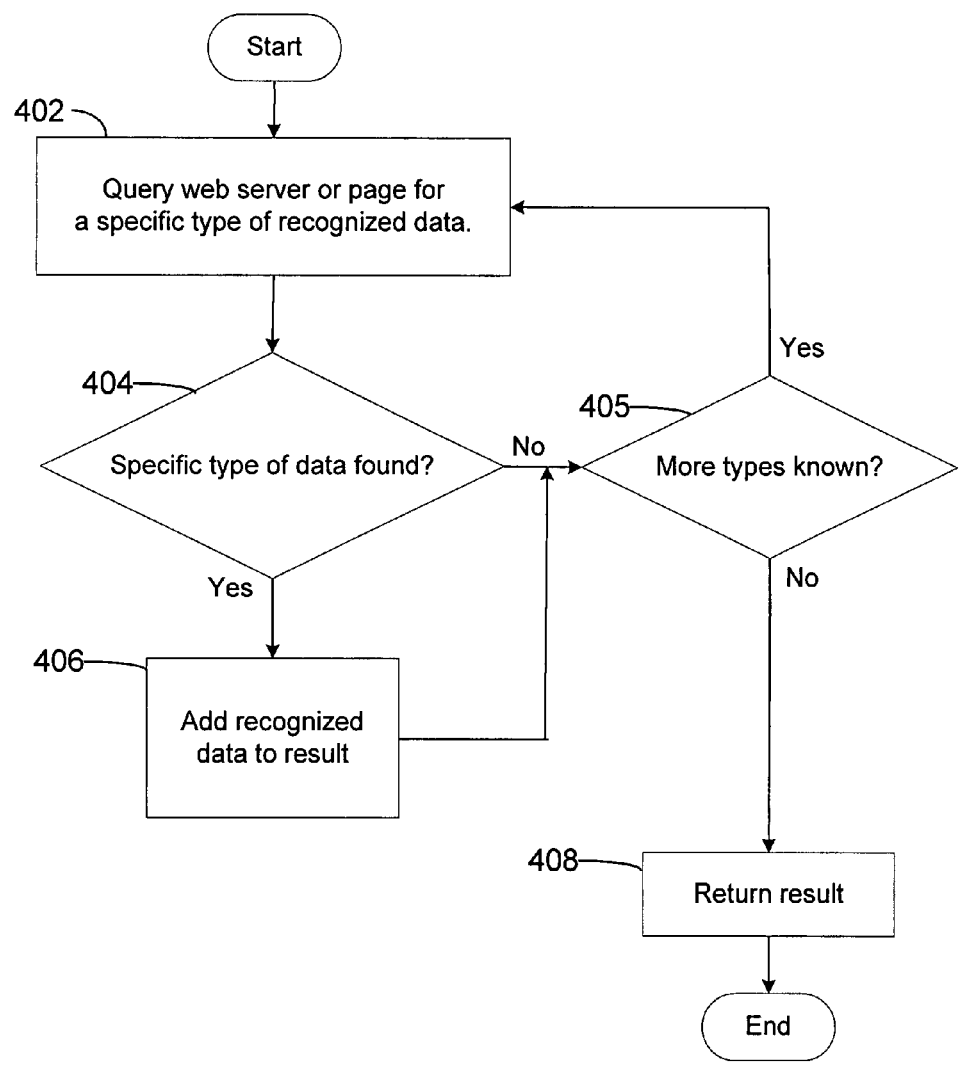
FIG. 4 is an illustrative flow diagram of a process for identifying descriptive data according to some embodiments of the invention.

FIG. 4 is an illustrative flow diagram of a process for identifying descriptive data according to some embodiments of the invention. The process of FIG. 4 corresponds to step 304 of FIG. 3. At block 402, the site content, e.g., a web page or data on a web server, is queried for a specific type of recognized data. Block 402 may use string matching, regular expression pattern matching, searches for metadata files of known formats, such as vCard or iCalendar files, or other text search methods. Block 404 determines if a specific type of recognized data has been found. If so, block 406 adds the recognized data to a result, which will be returned to the calling process. If no recognized data has been found, block 405 checks if more types of recognizable data are known, and if so, invokes block 402 again to search for another type of recognized data. If no other types of recognizable data are known, then block 408 is invoked to return the current result. Types of recognizable data include an address, which is detected by string matching on the web page data, an address detected in a vCard file in the web site's root directory (or other directory, or by following a link from a page on the web site). Another type of recognizable data is schedule information, which is detected by searching for an iCalendar file in the root directory (or other directory or linked page).

Figure 5:
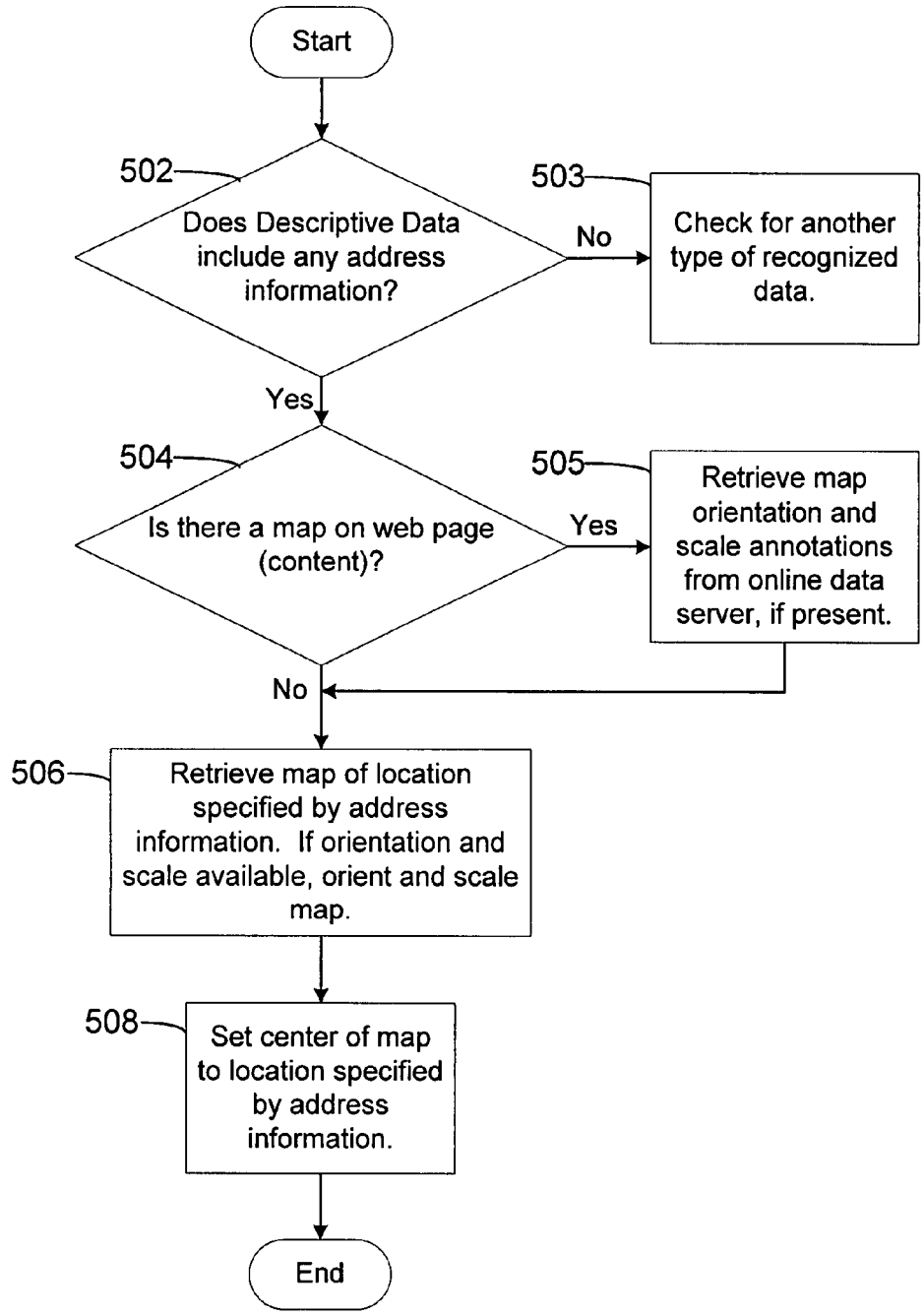
FIG. 5 is an illustrative flow diagram of a process for retrieving additional content related to descriptive data.

FIG. 5 is an illustrative flow diagram of a process for retrieving additional content related to descriptive data. The process of FIG. 5 corresponds to step 308 of FIG. 3. The process starts at block 503, which determines if the descriptive data includes any address information. If not, block 503 repeatedly calls block 502 for each type of recognizable data. If the descriptive data does include address information, block 504 determines if there is a map on the web page currently being viewed in the browser. If there is a map, block 505 retrieves map orientation and scale metadata (i.e., annotations) from the online data source that was identified in block 306 of FIG. 3, and transfers control to block 506. If there is no map on the web page, block 504 transfers control to block 506 to retrieve a map (there will be no combination of maps in this case). Block 506 retrieves a map of a location specified by the address information detected in block 502, if any such address information was found. If the orientation and scale were detected in block 505, block 506 also adjusts the maps orientation and scale. Similarly, latitude and longitude values may be retrieved from the metadata at block 505. Next, block 508 sets the center of the map to a location specified by the address information or by the latitude and longitude values.

Figure 6:
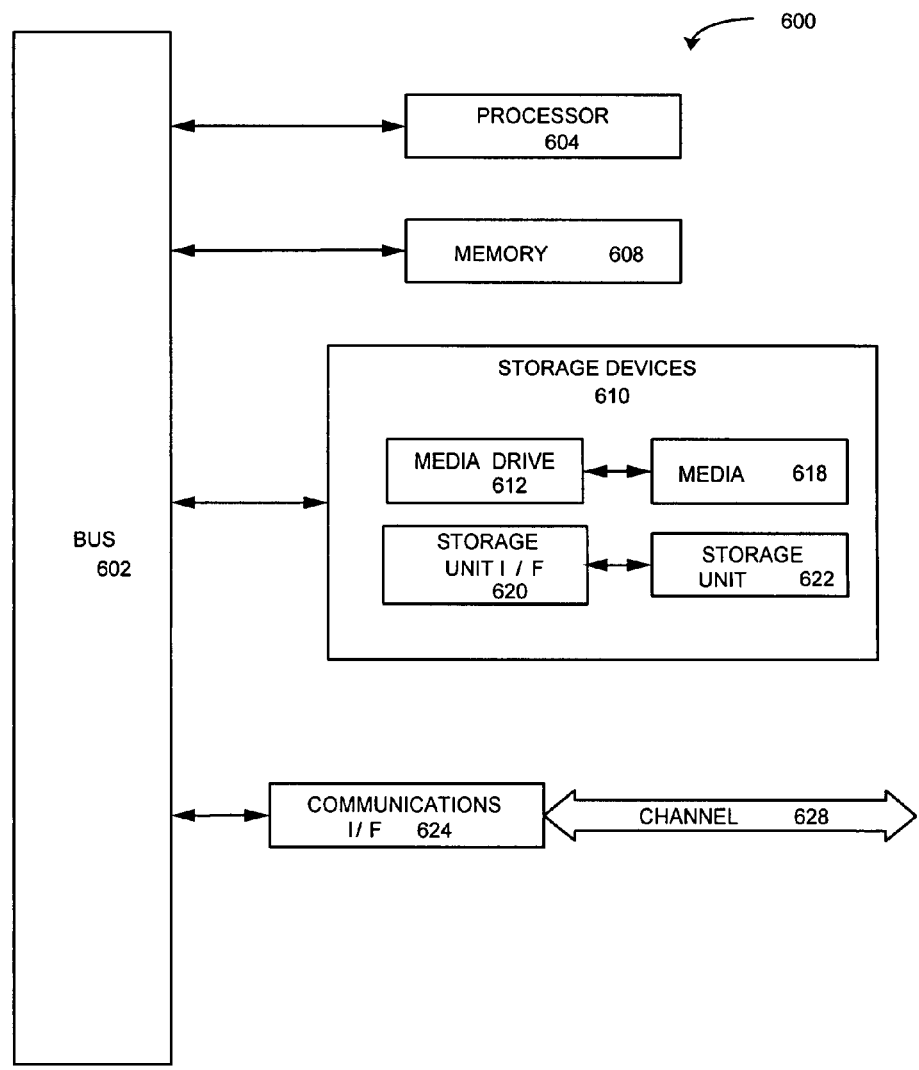
FIG. 6 is an illustrative drawing of an exemplary computer system that may be used in accordance with some embodiments of the invention.

FIG. 6 is an illustrative drawing of an exemplary computer system that may be used in accordance with some embodiments of the invention. FIG. 6 illustrates a typical computing system 600 that may be employed to implement processing functionality in embodiments of the invention. Computing systems of this type may be used in clients and servers, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618, may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 608, storage device 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

The methods disclosed herein allow a user to scan tables of numbers and quickly identify the important information. Aggregating and visually highlighting the streak information provides information that is not readily available in existing statistics displays.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:
   acquiring, at a web browser on a client device via a network, from a provider of a website, a webpage of the web site, the webpage comprising text data including descriptive data embedded in the text data conforming to a particular format;
   executing, by the client device, an intermediary process when the webpage is loaded by the web browser;
   in response to loading the webpage and prior to display of the webpage, identifying, by the intermediary process, the descriptive data embedded in the text data by searching the text data to determine if the text data includes data matching the particular format using a method chosen from a group of methods consisting of string matching, regular expression pattern matching, and searching for metadata files of known formats;
   selecting, by the intermediary process, an online data source based on the particular format, the online data source being separate from the website and unrelated to the provider of the website and having additional content relevant to the webpage;
   transmitting, by the intermediary process, the identified descriptive data to the online data source;
   receiving, by the intermediary process, a response from the online data source, the response including additional content related to the identified descriptive data for inclusion in the webpage;
   modifying, by the intermediary process, the webpage to include at least a portion of the additional content as an overlay; and
   displaying, by the web browser, the webpage and the portion of the additional content on a display of the client device as the overlay of the webpage, such that the additional content is displayed in association with content of the webpage.

2. The method of claim 1 wherein the online data source comprises a web site, a web service, or a combination thereof.

3. The method of claim 1, such that the particular format comprises a defined location format comprising a numeric zip code format, a street name format, a city name format, a country name format, or a combination thereof.

4. The method of claim 1, such that features of the webpage are displayed in combination with features of the additional content.

5. The method of claim 1, such that the webpage additionally comprises a reference to a data storage object that conforms to a defined file type, and the data storage object includes the descriptive data.

6. The method of claim 1, such that the online data source is selected by choosing an online map service if the webpage comprises a map.

7. The method of claim 6, such that receiving, at the client device, additional content from the online data source comprises receiving, by the client device, a map of a location specified by the descriptive data.

8. The method of claim 7, such that receiving, by the client device, a map of the location comprises receiving, by the client device, a map corresponding to a zip code, a city, a street address, or a combination thereof.

9. The method of claim 7, such that receiving, by the client device, a map of the location comprises receiving a map with a specified orientation, such that the descriptive data includes the specified orientation.

10. The method of claim 7, such that receiving, by the client device, a map of the location comprises receiving, by the client device, a map with a specified scale, such that the descriptive data includes the specified scale.

11. The method of claim 1, such that displaying, by the client device, an overlay comprises generating, by the client device, a displayable image to be superimposed on the webpage, such that the displayable image comprises at least a portion of the additional content.

12. The method of claim 11, such that the displayable image comprises a semi-transparent overlay to be displayed in a web browser.

13. A non-transitory computer-readable storage medium comprising computer-executable instructions, that when executed by a processor, perform a method comprising:
acquiring, via a network, from a provider of a website, a webpage of the website, the webpage comprising text data including descriptive data conforming to a particular format;
in response to loading the webpage and prior to display of the webpage, identifying the descriptive data embedded in the text data by searching the text data to determine if the text data includes data matching the particular format using a method chosen from a group of methods consisting of string matching, regular expression pattern matching, and searching for metadata files of known formats;
selecting an online data source based on the particular format, the online data source being separate from the website and unrelated to the provider of the website and having additional content relevant to the webpage;
transmitting the identified descriptive data to the online data source;
receiving a response from the online data source, the response including additional content related to the identified descriptive data for inclusion in the webpage;
modifying, by the client device, the webpage to include at least a portion of the additional content as an overlay; and
displaying, on a display of a client device, the webpage and the portion of the additional content as the overlay of the webpage, such that the additional content is displayed in association with content of the webpage.

14. The computer-readable storage medium of claim 13 wherein the online data source comprises a web site, a web service, or a combination thereof.

15. The computer-readable storage medium of claim 13, wherein the particular format comprises a defined location format comprising a numeric zip code format, a street name format, a city name format, a country name format, or a combination thereof.

16. The computer-readable storage medium of claim 13, such that the webpage additionally comprises a reference to a data storage object that conforms to a defined file type, and the data storage object includes the descriptive data.

17. The computer-readable storage medium of claim 13, further comprising instructions for selecting the online data source by choosing an online map service if the webpage comprises a map.

18. The computer-readable storage medium of claim 17, such that receiving additional content from the online data source comprises receiving a map of a location specified by the descriptive data.

19. The computer-readable storage medium of claim 18, such that receiving a map of the location comprises receiving a map corresponding to a zip code, a city, a street address, or a combination thereof.

20. A computing device comprising:
a processor;
a display device;
a non-transitory computer-readable storage medium for tangibly storing thereon program logic for execution by the processor, the program logic comprising:
webpage receiving logic for acquiring, via a network, from a provider of a web site, a webpage of the web site, the webpage comprising text data including descriptive data embedded in the text data conforming to a particular format;
searching logic for identifying, in response to loading the webpage and prior to display of the webpage, the descriptive data embedded in the text data by searching the text data to determine if the text data includes data matching the particular format using a method chosen from a group of methods consisting of string matching, regular expression pattern matching, and searching for metadata files of known formats;
format receiving logic for receiving, the defined format of the descriptive data, wherein parsing the text data comprises searching the text data to determine if the text data includes data matching the particular format;
online data source identification logic for, selecting an online data source based on the particular format, the online data source being separate from the web site and unrelated to the provider of the web site and having additional content relevant to the webpage;
retrieving logic for transmitting the identified descriptive data to the online data source and receiving a response from the online data source, the response including additional content related to the identified descriptive data for inclusion in the webpage;
overlay display logic for modifying, by the client device, the webpage to include at least a portion of the additional content as an overlay; and
display logic for displaying, on the display device, the portion of the additional content on the display of the computing device as the overlay of the webpage, such that the additional content is displayed in association with content of the webpage.

21. The computing device of claim 20 such that a storage medium stores program logic for execution by the processor, the program logic comprising logic for a web browser, such that the web browser includes an intermediary process comprising the searching logic, the format receiving logic, the online data source identification logic, and the retrieval logic, and the overlay display logic.

22. The computing device of claim 21 such that the intermediary process is a toolbar.

23. The method of claim 1 further comprising: determining that the webpage does not include a map and displaying the additional content on a map in the form of a semi-transparent overlay, the map comprising at least one geographic location.

24. The method of claim 1 wherein the additional content comprises a first annotation by a user associated with the computing device, wherein the first annotation relates to the webpage.

25. The method of claim 24, additionally comprising:
- receiving, by the computing device, a second annotation from the user relating to the webpage; and
- transmitting, over the network, the second annotation to the online data source, causing the online data source to associate the user and the webpage with the second annotation.

26. The computer-readable storage medium of claim 13, such the instructions executable by a processor comprise a toolbar in a web browser.

* * * * *